United States Patent
Chang

(10) Patent No.: US 12,198,320 B2
(45) Date of Patent: Jan. 14, 2025

(54) ELECTRONIC DEVICE AND METHOD FOR DETECTING TOOL STATE BASED ON AUDIO

(71) Applicant: HON HAI PRECISION INDUSTRY CO., LTD., New Taipei (TW)

(72) Inventor: Yueh Chang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 586 days.

(21) Appl. No.: 17/401,556

(22) Filed: Aug. 13, 2021

(65) Prior Publication Data

US 2022/0051394 A1    Feb. 17, 2022

(30) Foreign Application Priority Data

Aug. 13, 2020    (CN) .................. 202010815084.X

(51) Int. Cl.
*G06T 7/00*    (2017.01)
*G05B 19/18*    (2006.01)
*G06T 5/50*    (2006.01)
*G06V 10/75*    (2022.01)
*G10L 21/0232*    (2013.01)

(52) U.S. Cl.
CPC .......... *G06T 7/0004* (2013.01); *G05B 19/182* (2013.01); *G06T 5/50* (2013.01); *G06V 10/754* (2022.01); *G10L 21/0232* (2013.01); *G06T 2207/20081* (2013.01); *G06T 2207/20084* (2013.01); *G06T 2207/30164* (2013.01)

(58) Field of Classification Search
CPC ............ G06T 7/0004; G06T 5/50; G06T 2207/20081; G06T 2207/20084; G06T 2207/30164; G05B 19/182; G05B 2219/49307; G05B 2219/50203; G05B 19/4065; G05B 2219/37337; G06V 10/754; G06V 10/806; G10L 21/0232; G10L 25/18; G10L 25/51; G10L 15/16; G10L 25/30; G01H 17/00; G01H 1/003
See application file for complete search history.

(56) References Cited

U.S. PATENT DOCUMENTS

2013/0035776 A1*   2/2013   Kunstadt ............ G05B 19/4163
                                                   700/94

FOREIGN PATENT DOCUMENTS

| | | |
|---|---|---|
| CN | 106992000 | 7/2017 |
| JP | 2006130604 | 5/2006 |
| TW | I670138 | 9/2019 |

* cited by examiner

*Primary Examiner* — Hwa Andrew Lee
(74) *Attorney, Agent, or Firm* — ScienBiziP, P.C.

(57) ABSTRACT

A method for detecting defects in working CNC tools in real time, implemented in an electronic device, includes acquiring sounds of operation of a tool during a cutting or other operation process and dividing the acquired cutting sounds into a plurality of recordings of audio according to a preset time interval. Time-frequency features of the plurality of recordings of audio are acquired according to multiple feature transformation methods and a fusion feature image of the cutting sound is formed according to the extracted time-frequency features. A tool detection model is generated by training the fusion feature image, and any defects of the tool and any defect types the tool has are detected according to the tool detection model.

12 Claims, 6 Drawing Sheets

ELECTRONIC DEVICE AND METHOD FOR DETECTING TOOL STATE BASED ON AUDIO

CROSS-REFERENCE TO RELATED APPLICATIONS

This application claims priority to Chinese Patent Application No. 202010815084.X filed on Aug. 13, 2020, the contents of which are incorporated by reference herein.

FIELD

The subject matter herein generally relates to tool management in manufacturing, and particularly to an electronic device and a tool detecting method.

BACKGROUND

CNC (Computerized Numerical Control) devices are widely used in manufacturing. The CNC device is equipped with tools for processing workpieces, materials, and other products. Due to high precision requirements for product processing, the quality control of tools is becoming more and more important. Tools are usually detected based on models established by features extracted from vibrations and related high-frequency audio signals, however, the tool detection is not in real-time.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
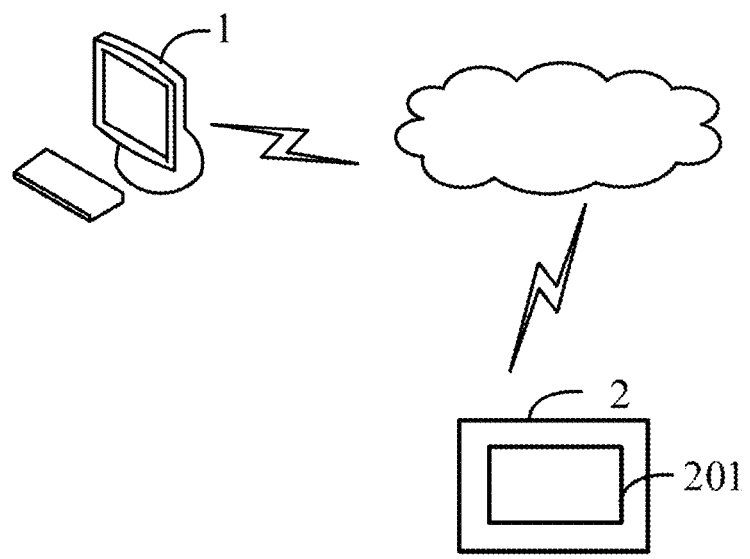
FIG. 1 is a schematic view of an embodiment of an application environment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a acquiring of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device (electronic device 1) may communicate with at least one CNC device 2 through a network. In one embodiment, the network may be a wired network or a wireless network. The wireless network may be radio, WI-FI, cellular, satellite, broadcast, etc.

In one embodiment, the electronic device 1 runs tool detection programs. The electronic device 1 may be a personal computer or a server. The sever may be a single server, a server cluster, or a cloud server.

The CNC device 2 at least includes a number of tools 201. The tool 201 is used for processing workpieces. The CNC device 2 controls the tools 201 to work.

Figure 2:
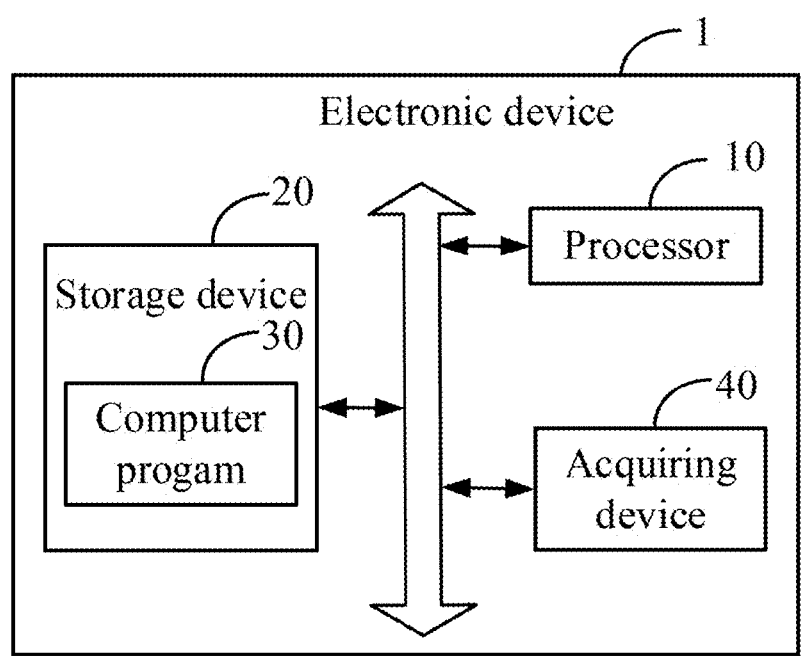
FIG. 2 is a block diagram of an embodiment of an electronic device according to the present disclosure.

FIG. 2 illustrates the electronic device 1 in one embodiment. The electronic device 1 includes, but is not limited to, a processor 10, a storage device 20, a computer program 30, and an acquiring device 40. FIG. 2 illustrates only one example of the electronic device 1. Other examples may include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 may include various types of non-transitory computer-readable storage mediums. For example, the storage device 20 may be an internal storage system, such as a flash memory, a random access memory (RAM) for the temporary storage of information, and/or a read-only memory (ROM) for permanent storage of information. The storage device 20 may also be an external storage system, such as a hard disk, a storage card, or a data storage medium. The processor 10 can execute the computer program 30 to implement the tool detecting method.

In one embodiment, the acquiring device 40 may be a sound sensor. The acquiring device 40 aligns with each of the number of tools 201 and acquires a sound generated by each tool 201 during a cutting process. A sensitivity of the sound sensor may be 50 mV/Pa, a frequency band sensing accuracy may be $1*10^{-12}$, and an effective working range may be 40 dB-120 dB. In other embodiments, the acquiring device 40 may also be a microphone.

Figure 3:
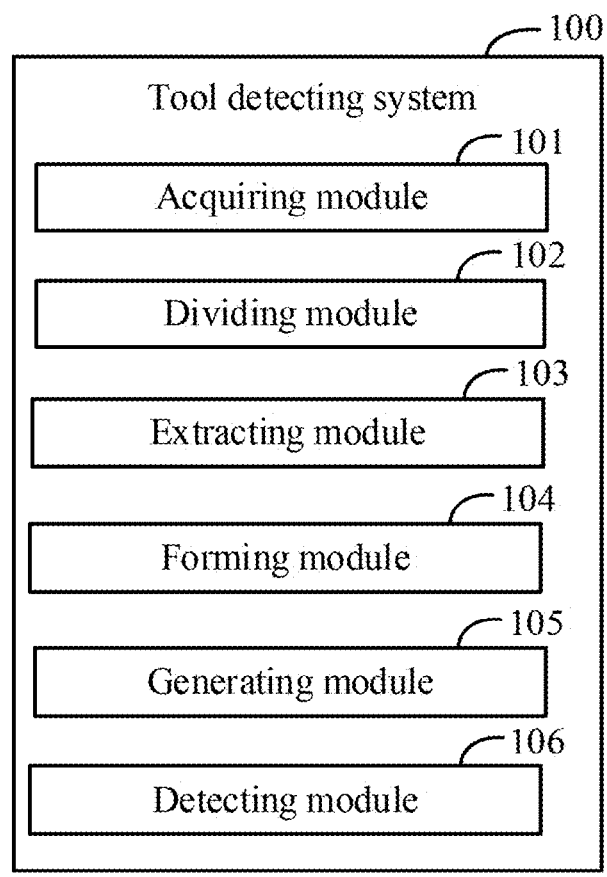
FIG. 3 is a block diagram of an embodiment of a tool detecting system according to the present disclosure.

As illustrated in FIG. 3, the electronic device 1 runs a tool detecting system 100. The tool detecting system 100 at least includes an acquiring module 101, a dividing module 102, an extracting module 103, a forming module 104, a generating module 105, and a detecting module 106. The modules 101-106 may be collections of software instructions stored in the storage device 20 of the electronic device 1 and executed by the processor 10. The modules 101-106 may also include functionality represented by hardware or integrated circuits, or by software and hardware combinations, such as a special-purpose processor or a general-purpose processor with special-purpose firmware.

The acquiring module 101 is configured to control the acquiring device 40 to acquire a cutting sound of the tool 201 during the cutting process.

In one embodiment, the acquiring module 101 controls the acquiring device 40 to acquire and record the sounds generated by the tool 201 during the cutting process, the acquired sounds may include the cutting sound or the sound of other operation carried out by the tool 201, the sound of other operation carried out by the tool 201 is taken as a non-cutting sound, and filters out the non-cutting sound in the acquired sounds to retain the cutting sound. That is, the non-cutting sound may be the sound acquired by the acquiring device 40 when the tool 201 is not performing its cutting process, the cutting sound may be the sound acquired by the acquiring device 40 when the tool 201 is performing the cutting process.

At this time, a state of the tool 201 is known, that is, the tool 201 is taken to have no defects, or have at least one defect, or have at least one defect with a known defect type, the known defect type can be chipping, wear, or the like.

The dividing module 102 is configured to divide the acquired cutting sound into a number of recordings of audio according to a preset time interval.

In one embodiment, the preset time interval may be 3 seconds, that is, the duration of each recording of audio is 3 seconds. In other embodiments, the preset time interval may also be other required value.

The extracting module 103 is configured to extract time-frequency features of the number of recordings of audio according to multiple feature transformation methods.

In one embodiment, the multiple feature transformation methods include, but are not limited to, a short-time Fourier transform, a wavelet transform, and a Gabor transform.

In one embodiment, the extracting module 103 calculates a frequency f corresponding to a maximum amplitude of the number of recordings of audio using a Fourier transform, and determines an x-fold frequency xf according to harmonics of the frequency f. Preferably, x may be 3, that is, the extracting module 103 determines a triple frequency 3f according to the harmonics of the frequency f. In other embodiments, x may also be 2.

Figure 4:
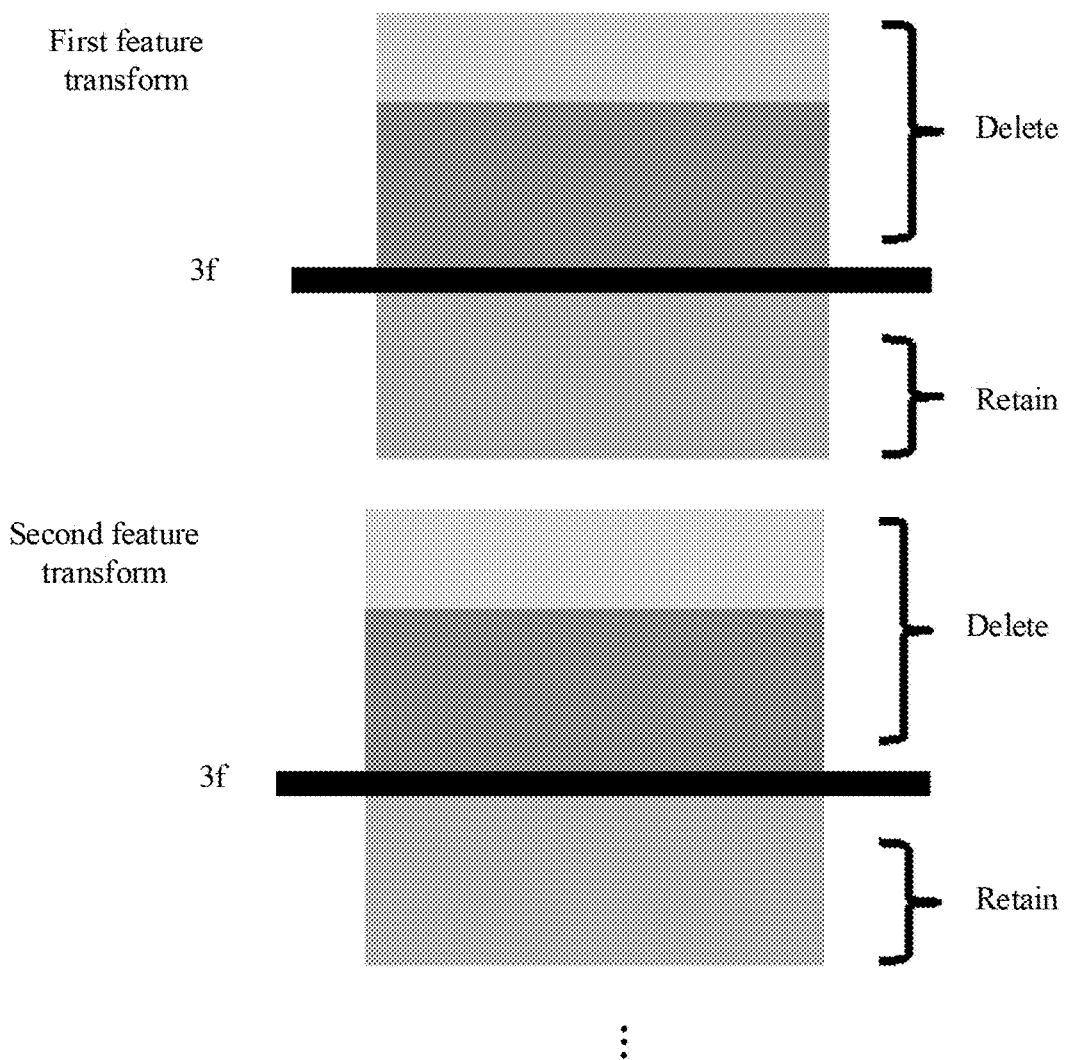
FIG. 4 is a schematic view of an embodiment of time-frequency images of recordings of audio of a tool according to the present disclosure.

Referring to FIG. 4, a first feature transformation method may be the short-time Fourier transform. The extracting module 103 performs the short-time Fourier transform on the number of recordings of audio to extract the time-frequency features of the cutting sound. The extracting module 103 further filters out time-frequency features above the triple frequency 3f (i.e., greater than the triple frequency 3f) in the time-frequency features.

In detail, the extracting module 103 performs the short-time Fourier transform on the number of recordings of audio to generate a corresponding time-frequency image, determines a frequency range from 0 to 3f in a matrix of the time-frequency image, and searches for a minimum value in the frequency range of 0 to 3f on a vertical axis of the time-frequency image and a time range t to t+k on a horizontal axis of the time-frequency image.

In one embodiment, t is a current time and k is a size of each segment of audio frames in milliseconds. The extracting module 103 further replaces energy values corresponding to the frequency above 3f with −1 to filter out the time-frequency features above the triple frequency 3f. It should be noted that, the time-frequency image may be a two-dimensional image, and while the time-frequency image is generated, replacing the energy values above the triple frequency 3f with −1 may uniformly adjust a color of areas where above the triple frequency belongs to in the time-frequency image to be black, the benefit is equivalent to removing the effect of the audios in the triple or more frequency in image learning.

In one embodiment, the extracting module 103 further uses the wavelet transform (a second feature transform method in FIG. 4) and the Gabor transform to extract the time-frequency features corresponding to the number of recordings of audio through the above process.

The forming module 104 is configured to form a fusion feature image of the cutting sound according to the extracted time-frequency features.

Figure 5:
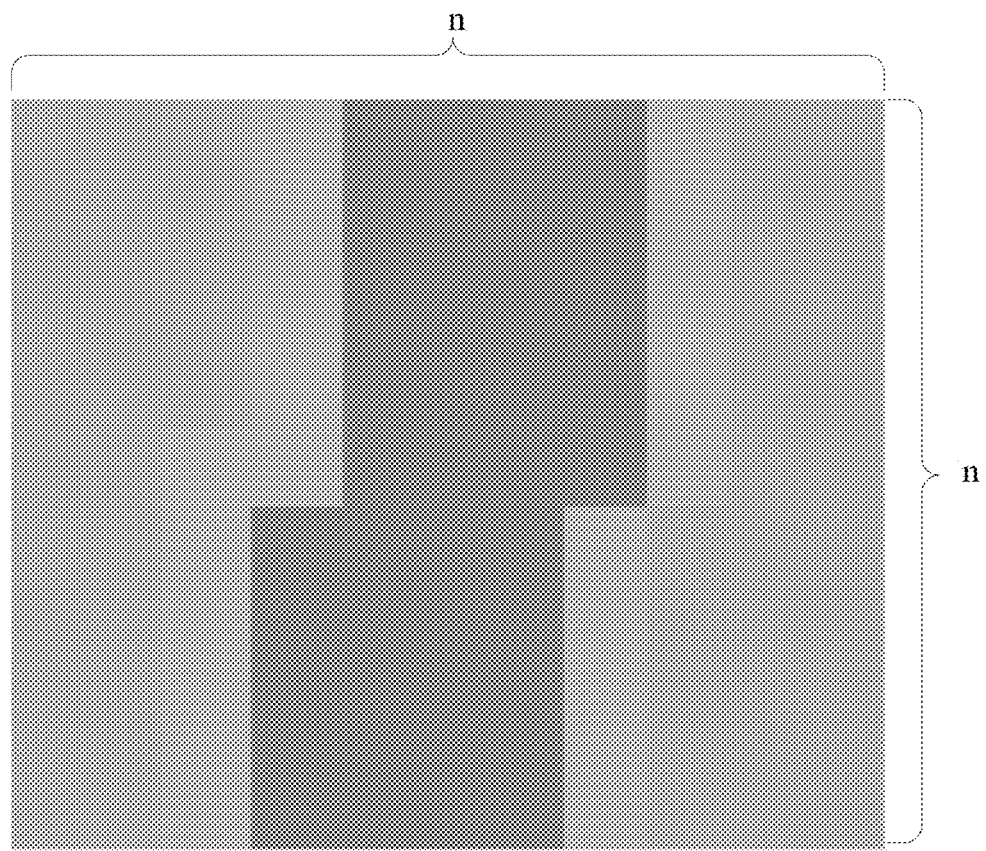
FIG. 5 is a schematic view of an embodiment of a fusion feature image of recordings of audio of the tool according to the present disclosure.

Referring to FIG. 5, in one embodiment, the forming module 104 calculates a total number of pixels N according to the number of pixels of the time-frequency image generated by each feature transformation method, and determines a closest square root n of the total number of pixels N. In one embodiment, n represents the number of pixels in the horizontal and vertical directions of the fusion feature image. The forming module 104 sequentially arranges the pixels of the time-frequency image generated by each feature transformation method to form the fusion feature image with the number of pixels n*n.

In detail, the forming module 104 generates a square containing N pixels according to the square root n that is the closest to the total number of pixels N, and then performs a normalization process on pixel values of the pixels in the time-frequency image. The normalization process may be a normalization processing of 0-255, thereby avoiding the differences in different feature metrics. The calculation formula of the normalization process is x=255(x−min)/max−min. In this formula, min is the minimum value 0, max is the maximum value 255, and x is the pixel value after the normalization process. The forming module 104 further fills the first pixel value in the first pixel grid which is located at the upper left corner of the square, and then arranges other pixel values sequentially from top to bottom, so as to form the fusion feature image.

The forming module 104 forms the time-frequency image according to a sequence of feature transformation, and obtains the pixel values of the pixels in the time-frequency image according to a sequence from left to right or from top to bottom, and then arranges the obtained pixel values from top to bottom in the square, to form the fusion feature image. The first pixel value is the pixel value of the first pixel in the time-frequency image generated by the above-mentioned first feature transformation method (i.e. the short-time Fourier transform) processing the number of recordings of audio, and the pixel value filled in each pixel grid is the pixel value of each pixel of the time-frequency images generated by the various feature transformation methods.

The generating module 105 is configured to generate a tool detection model by training the fusion feature image.

In one embodiment, the generating module 105 performs a histogram equalization process on the fusion feature image, to enhance the contrast of the fusion feature image.

In one embodiment, the generating module 105 inputs the fusion feature images corresponding to the tools 201 in a number of known states as a training set into a convolutional neural network model for training, so as to generate the tool detection model. The known states indicates that the defect types of the tools 201 are known.

In detail, the convolutional neural network model includes an input layer, a first convolutional layer, a second convolutional layer, a third convolutional layer, a fourth convolutional layer, and a softmax layer. The input layer is the fusion feature image. The input of the first convolutional layer is connected to the input layer, and the output of the first convolutional layer is connected to the input of the second convolutional layer after being sequentially connected to a first BN layer, a first activation layer, and a first pooling layer; the output of the second convolutional layer is sequentially connected to a second BN layer, a second activation layer, and a second pooling layer, and then connected to the input of the third convolutional layer; the output of the third convolutional layer is sequentially connected to the input of the fourth convolutional layer after being connected to a third BN layer and a third activation layer; the output of the fourth convolutional layer is connected to a fourth BN layer, a fourth activation layer, and a fourth pooling layer in sequence, after being connected to the input of the softmax layer through a three-layer fully connected layer. The activation function of the activation layer connected behind each convolutional layer can be a linear rectification function (Rectified Linear Unit (ReLU)), which turns the linear mapping into a nonlinear mapping, which is more conducive to the extraction and learning of nonlinear features. The pooling layer MaxPool connected after the activation layers of the first convolutional layer, the second convolutional layer and the fourth convolutional layer is conducive to downsampling and reducing the amount of calculations, while improving the extraction of regional features by the convolutional neural network Effect. The output results of the convolutional neural network model are two types, and the result of detection is the one with the higher score.

The above-mentioned training process of convolutional neural network model is divided into two parts: forward propagation and back propagation. The fusion feature images in the training set are input into a convolutional neural network, the predicted value is obtained by the convolutional neural network model, and the weighting is updated through a method of supervised learning. The above-mentioned training process of the convolutional neural network model is repeated until an error between the predicted value and a target value meets an expected value, at this time, the tool detection model is generated.

The detecting module 106 is configured to detect a state of an operating tool 201 according to the tool detection model.

In one embodiment, the detection module 106 may extract the fusion feature image corresponding to the cutting sound of the operating tool 201 by the above method, and then input the fusion feature image into the tool detection model, and determine whether the operating tool 201 has any defects and if so the types of the defects the operating tool 201 has, by the tool detection model recognizing and classifying the fusion feature image.

In one embodiment, the tool detection model defines a relationship between the time-frequency features of the cutting sound of the tools 201 and the defect types of the tools 201 by the above-mentioned training process. Thus, if the time-frequency feature (i.e. the fusion feature image) of the operating tool is input into the tool detection model, the tool detection model may recognize and classify the time-frequency feature of the operating tool 201, and output the defect type of the operating tool 201 or a result that the operating tool 201 does not have any defect, the state of the operating tool 201 is thus determined. For example, the defect type can be at least one of chipping, wear, and breaking.

Figure 6:
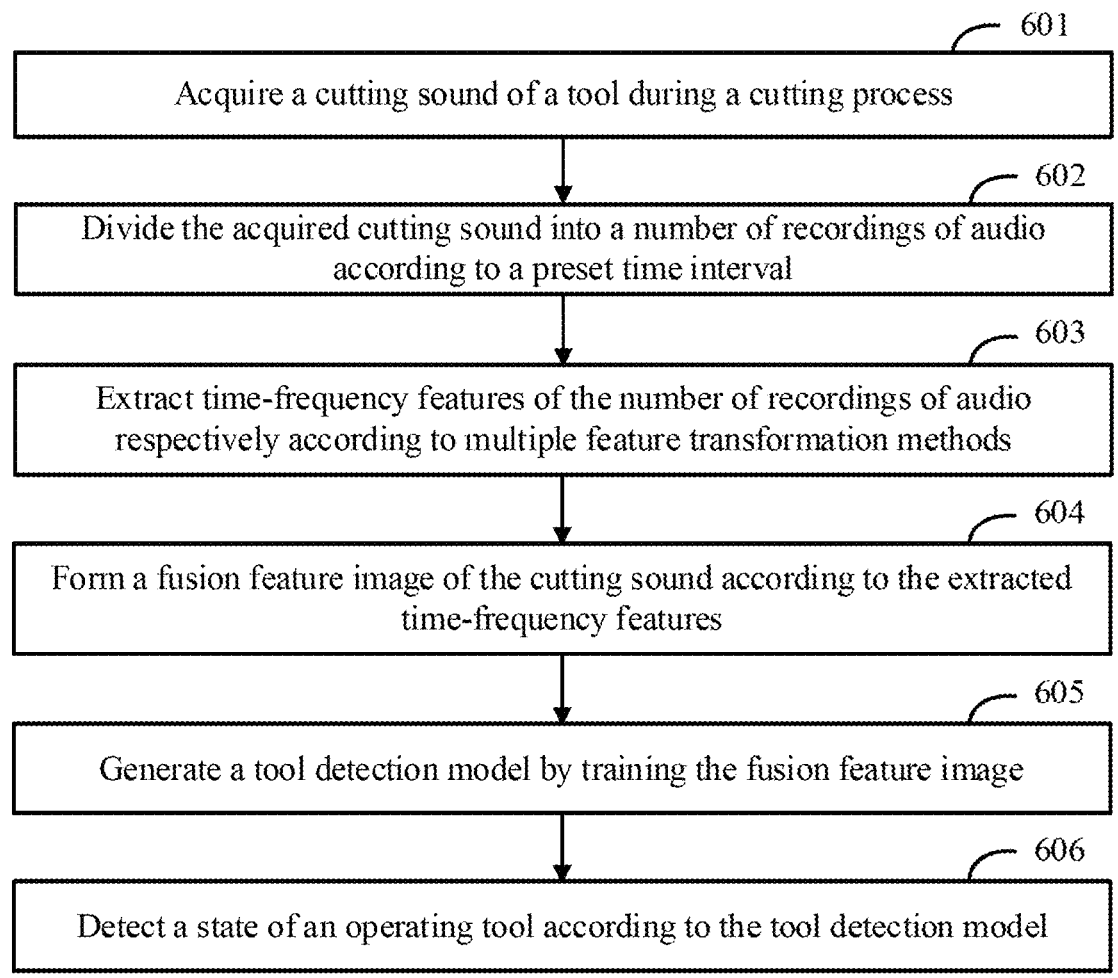
FIG. 6 illustrates a flowchart of an embodiment of a tool detecting method according to the present disclosure.

FIG. 6 illustrates a flowchart of an embodiment of a tool detecting method. The method is provided by way of example, as there are a variety of ways to carry out the method. The method described below may be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method may begin at block 601.

At block 601, the acquiring module 101 controls the acquiring device 40 to acquire a cutting sound of the tool 201 during the cutting process.

At block 602, the dividing module 102 divides the acquired cutting sound into a number of recordings of audio according to a preset time interval.

At block 603, the extracting module 103 extracts time-frequency features of the number of recordings of audio according to multiple feature transformation methods.

At block 604, the forming module 104 forms a fusion feature image of the cutting sound according to the extracted time-frequency features.

At block 605, the generating module 105 generates a tool detection model by training the fusion feature image.

At block 606, the detecting module 106 detects a state of an operating tool 201 according to the tool detection model.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:
1. An electronic device comprising:
at least one processor; and
a storage device coupled to the at least one processor and storing instructions for execution by the at least one processor to cause the at least one processor to:
acquire a cutting sound of a tool during a cutting process;
divide the acquired cutting sound into a plurality of recordings of audio according to a preset time interval;
extract time-frequency features of the plurality of recordings of audio respectively according to multiple feature transformation methods, wherein the multiple feature transformation methods include a short-time Fourier transform, a wavelet transform, and a Gabor transform, the time-frequency features comprise a plurality of time-frequency images;
form a fusion feature image of the cutting sound according to the extracted time-frequency features;

calculate a total number of pixels N according to a number of pixels of the plurality of time-frequency images generated by the multiple feature transformation methods;

determine a closest square root n of the total number of pixels N;

form the fusion feature image with the number of pixels n*n by sequentially arranging the pixels of the time-frequency image generated by each of the multiple feature transformation methods;

generate a tool detection model by training a convolutional neural network model using a plurality of fusion feature images;

take the plurality of fusion feature images corresponding to a plurality of tools in a plurality of known states as a training set;

generate the tool detection model by training the convolutional neural network model using the training set; and detect a state of an operating tool according to the tool detection model.

2. The electronic device according to claim 1, wherein the cutting sound of the tool during the cutting process is acquired by:

acquiring sounds generated by the tool during the cutting process; and filtering out a non-cutting sound in the acquired sounds to retain the cutting sound.

3. The electronic device according to claim 1, wherein the time-frequency features of the plurality of recordings of audio are extracted respectively according to the multiple feature transformation methods by:

calculating a frequency f corresponding to a maximum amplitude of the plurality of recordings of audio using a Fourier transform;

determining an x-fold frequency xf according to harmonics of the frequency f, extracting the time-frequency features of the cutting sound by performing the short-time Fourier transform, the wavelet transform, and the Gabor transform respectively on the plurality of recordings of audio; and filtering out time-frequency features above the x-fold frequency xf in the time-frequency features of the cutting sound.

4. The electronic device according to claim 3, wherein the time-frequency features of the plurality of recordings of audio are extracted respectively according to the multiple feature transformation methods by:

performing the short-time Fourier transform, the wavelet transform, and the Gabor transform respectively on the plurality of recordings of audio to generate a corresponding time-frequency image;

determining a frequency range from 0 to xf in a matrix of the time-frequency image;

searching for a minimum value in the frequency range of 0 to xf on a vertical axis and a time range t to t+k on a horizontal axis in the time-frequency image, wherein t is a current time and k is a size of each segment of audio frames; and replacing energy values corresponding to frequencies above xf with −1 to filter out the time-frequency features above the x-fold frequency xf.

5. The electronic device according to claim 1, wherein the fusion feature image with the number of pixels n*n is formed by:

generating a square containing N pixels according to the square root n that is the closest to the total number of pixels N;

performing a normalization process on pixel values of the pixels in the time-frequency image; and forming the fusion feature image by filling a first pixel value into a first pixel grid which is located at an upper left corner of the square, and arrange other pixel values sequentially from top to bottom of the square.

6. The electronic device according to claim 1, wherein the state of the operating tool according to the tool detection model is detected by:

extracting a fusion feature image corresponding to a cutting sound of the operating tool;

inputting the fusion feature image into the tool detection model; and determining whether the operating tool has any defects or any defect types the operating tool has by the tool detection model recognizing the fusion feature image.

7. A tool detecting method implemented in an electronic device comprising:

acquiring a cutting sound of a tool during a cutting process;

dividing the acquired cutting sound into a plurality of recordings of audio according to a preset time interval;

extracting time-frequency features of the plurality of recordings of audio respectively according to multiple feature transformation methods, wherein the multiple feature transformation methods include a short-time Fourier transform, a wavelet transform, and a Gabor transform, the time-frequency features comprise a plurality of time-frequency images;

forming a fusion feature image of the cutting sound according to the extracted time-frequency features;

calculating a total number of pixels N according to a number of pixels of the plurality of time-frequency images generated by the multiple feature transformation methods;

determining a closest square root n of the total number of pixels N;

forming the fusion feature image with the number of pixels n*n by sequentially arranging the pixels of the time-frequency image generated by each of the multiple feature transformation methods;

generating a tool detection model by training a convolutional neural network model using a plurality of fusion feature images;

taking the plurality of fusion feature images corresponding to a plurality of tools in a plurality of known states as a training set;

generating the tool detection model by training the convolutional neural network model using the training set; and detecting a state of an operating tool according to the tool detection model.

8. The method according to claim 7, wherein acquiring a cutting sound of a tool during a cutting process comprises:

acquiring sounds generated by the tool during the cutting process; and filtering out a non-cutting sound in the acquired sounds to retain the cutting sound.

9. The method according to claim 7, wherein extracting time-frequency features of the plurality of recordings of audio respectively according to multiple feature transformation methods comprises:

calculating a frequency f corresponding to a maximum amplitude of the plurality of recordings of audio using a Fourier transform;

determining an x-fold frequency xf according to harmonics of the frequency f, extracting the time-frequency features of the cutting sound by performing the short-time Fourier transform, the wavelet transform, and the Gabor transform respectively on the plurality of recordings of audio; and filtering out time-frequency features above the x-fold frequency xf in the time-frequency features of the cutting sound.

10. The method according to claim 9, wherein extracting the time-frequency features of the cutting sound further comprises:

performing the short-time Fourier transform, the wavelet transform, and the Gabor transform respectively on the plurality of recordings of audio to generate a corresponding time-frequency image;

determining a frequency range from 0 to xf in a matrix of the time-frequency image;

searching for a minimum value in the frequency range of 0 to xf on a vertical axis and a time range t to t+k on a horizontal axis in the time-frequency image, wherein t is a current time, and k is a size of each segment of audio frames; and replacing energy values corresponding to frequencies above xf with −1 to filter out the time-frequency features above the x-fold frequency xf.

11. The method according to claim 7, wherein forming a fusion feature image with the number of pixels n*n comprises:

generating a square containing N pixels according to the square root n that is the closest to the total number of pixels N;

performing a normalization process on pixel values of the pixels in the time-frequency image; and forming the fusion feature image by filling a first pixel value into a first pixel grid which is located at an upper left corner of the square, and arranging other pixel values sequentially from top to bottom of the square.

12. The method according to claim 7, wherein detecting a state of an operating tool according to the tool detection model comprises:

extracting a fusion feature image corresponding to a cutting sound of the operating tool;

inputting the fusion feature image into the tool detection model; and determining whether the operating tool has any defects or any defect types the operating tool has by the tool detection model recognizing the fusion feature image.

\* \* \* \* \*